United States Patent [19]

Regipa

[11] 4,387,868
[45] Jun. 14, 1983

[54] METHOD AND APPARATUS FOR LAUNCHING AND INFLATING A SPACE BALLOON

[75] Inventor: Robert Regipa, Toulouse, France

[73] Assignee: Centre National d'Etudes Spatiale, Paris, France

[21] Appl. No.: 218,728

[22] Filed: Dec. 22, 1980

[30] Foreign Application Priority Data

Jan. 4, 1980 [FR] France ............... 80 00344

[51] Int. Cl.³ ............... B64B 1/40
[52] U.S. Cl. ............... 244/31
[58] Field of Search ............... 244/31–32, 244/96–98, 128; 89/36 R; 102/9, 37.1, 34; 343/706; 40/212; 46/87

[56] References Cited

U.S. PATENT DOCUMENTS

| | | | |
|---|---|---|---|
| 1,031,148 | 7/1912 | Ranza | 244/31 |
| 2,919,083 | 12/1959 | Suomi et al. | 244/31 |
| 3,063,656 | 11/1962 | Bohl et al. | 244/31 |
| 3,311,328 | 3/1967 | Slater | 244/31 |

FOREIGN PATENT DOCUMENTS 1535761  7/1968  France ............... 244/31

Primary Examiner—Sherman D. Basinger
Assistant Examiner—Jesús D. Sotelo
Attorney, Agent, or Firm—Harold H. Dutton, Jr.

[57] ABSTRACT

The method of the invention for launching especially large-volume space balloons consists in using a space balloon (8) equipped with a non-stretching or slightly stretching axial tie (9) to which is fastened the upper pole of the balloon and alongside which the lower pole may slide, in using an auxiliary carrier balloon (1) of a lesser volume and provided with a non-stretching axial tie (2) between its upper and lower poles, in fastening the collapsed space balloon (preferably housed in a protective sheath 22) underneath the carrier balloon by connecting the axial ties of the two balloons, and in arranging a transfer duct (7) between these, in partially inflating the carrier balloon (1), and, after transferring a given amount of gas into the space balloon, in inducing the sealing of the transfer duct (7), the separation between the space balloon (7) and the carrier balloon (1) and the locking of the power pole of the space balloon on the axial tie (9) of same.

12 Claims, 15 Drawing Figures

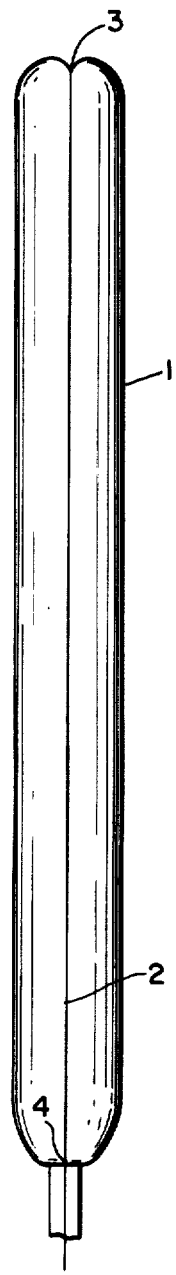  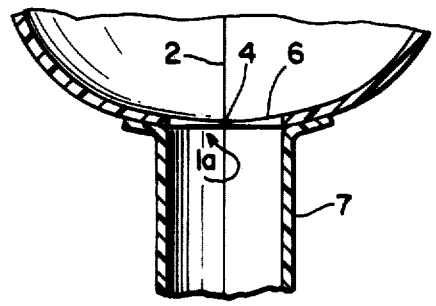 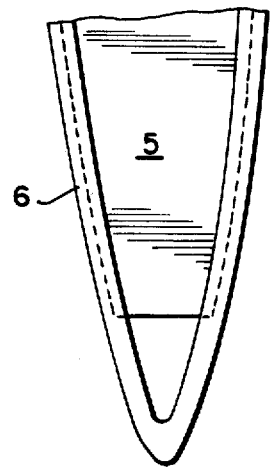 
FIG. 1
FIG. 2
FIG. 3
FIG. 4
FIG. 5

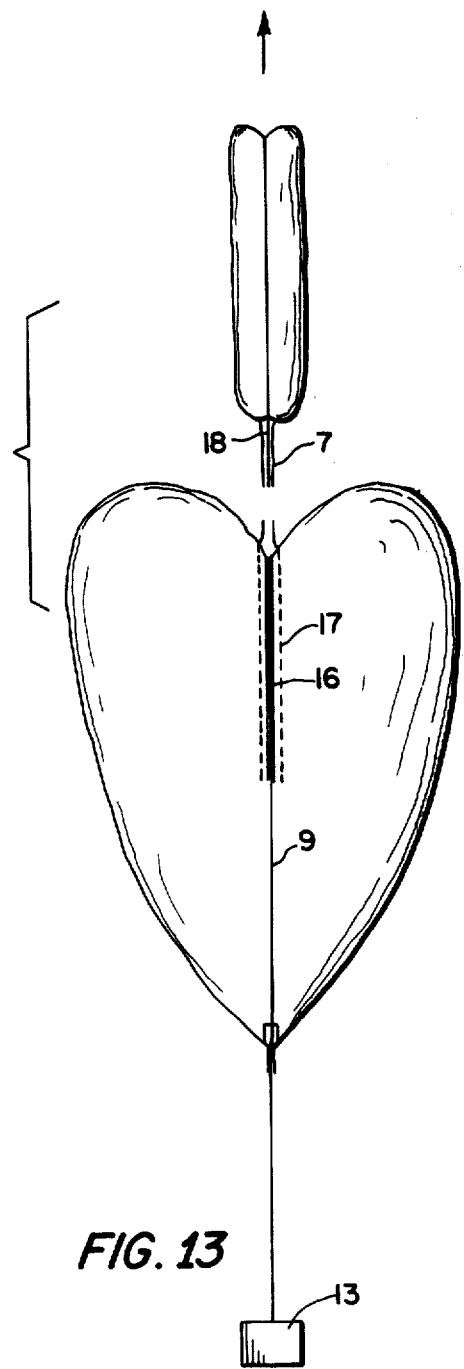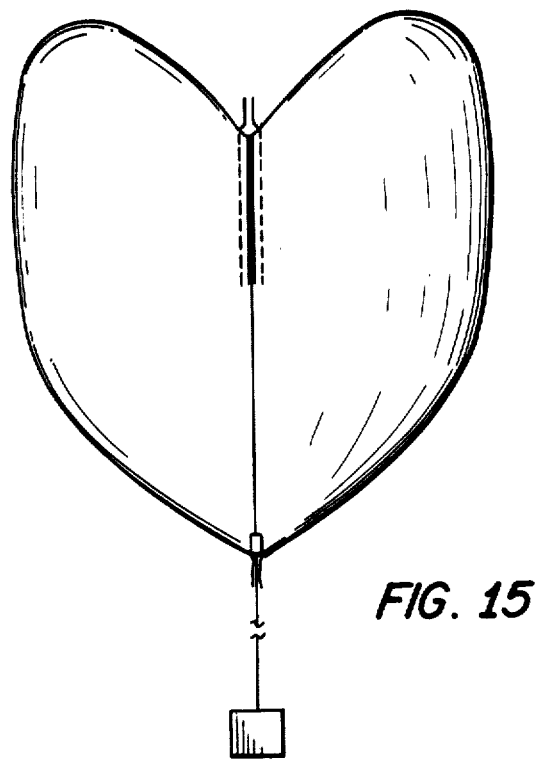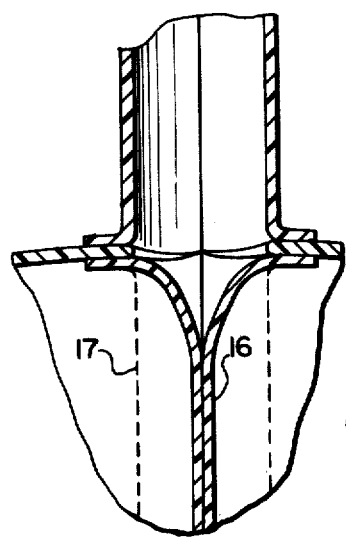
FIG. 13
FIG. 15
FIG. 14

METHOD AND APPARATUS FOR LAUNCHING AND INFLATING A SPACE BALLOON

The invention relates to a process for launching and inflating a space balloon carrying a load. In particular it concerns launching high-volume balloons for the exploration of the high stratospheric layers. The invention extends to a carrier balloon for implementing this launching process.

It is known that launching high-volume balloons into very high atitudes presently presents problems which have been only poorly resolved. In the first place, if there are adverse meteorological conditions on the ground, inflation will be very difficult and balloon envelope then may be subjected to serious wind stresses sometimes resulting in tears. Furthermore, even in the absence of wind, inflating the balloon at a fixed point determines a tensional distribution across the envelope which is much different from that of the inflated state in flight, with excess local tensions which require either larger sizes of the envelope material to permit withstanding the fixed-point inflation, or else a number of precautionary steps that make the launch more complex and costly (emplacing the sleeve, etc.).

Again, while rising, the balloon encounters very severe atmospheric conditions, on one hand when crossing the lower atmospheric layers of high density which are the sites of high turbulence, and on the other hand when crossing the tropopause, which is the coldest zone of the atmosphere ($-70$ to $-80°$ C.) and which is the site of horizontal flows of very high speed gradients.

The expansion of the balloon still is minor in the lower layers and the stresses exerted on it are borne by a reduced envelope surface, so that high unit area forces are exerted. As regards the tropopause, the low temperatures embrittle the envelope material which thereby is less able to withstand the speed gradient stresses. These stresses generate shear effects which become higher, the larger the balloon volume.

Consequently space balloons frequently are subjected to degradations in those layers which in the case of large balloons (of the order of a million $m^3$ or more) may totally disjoint them.

It is the object of the present invention to offer a solution to the problems cited above and to make it possible for space balloons to reach the stratospheric layers which are to be explored, without danger of degradation.

To that end, the invention proposes a novel method of launching and inflating a space balloon whereby the stresses exerted on its envelope are substantially reduced both on the ground before ascent and during the crossing of the lower layers and the tropopause.

Another object of the invention is the substantial weight reduction of the balloon for a given mission in order to reduce costs.

A still other object is to facilitate especially the ground launching operations.

The method of the invention for launching and inflating a load-carrying space balloon consists of:

using a space balloon equipped with a non-stretching, or only slightly-stretching axial tie means to which is fastened the upper pole of said balloon and along which its lower pole may slide as far as a fixed predetermined position for said lower pole on said axial tie means, the load being suspended from said axial tie means, using an auxiliary carrier balloon of a lesser volume and provided with a non-stretching or only sightly stretching tie means between its upper and lower poles, and of high strength to withstand the stresses generated in the atmospheric layers being crossed, fastening the space balloon in the collapsed state to the underside of the carrier balloon, connecting on one hand the axial tie means of the two balloons and on the other hand placing between them a gas transfer duct joining the inside volumes of their envelopes, partly inflating the carrier balloon with a gas lighter than air to generate the take-off of the balloons, following the transfer of a given amount of gas into the space balloon, causing the sealing of the transfer duct, causing the space balloon and the carrier balloon to separate by severing the transfer duct and the tie means joining the two balloons, following the sliding of the lower pole of the space balloon along the axial tie means, securing the locking of said lower pole to said axial tie means in the above cited predetermined position to achieve the filled state of the space balloon.

It should be noted that the three last cited operations (sealing the duct, separating the balloons and locking the lower pole of the space balloon) can be carried out sequentially in a predetermined order or more or less simultaneously at a given altitude.

Preferably the space balloon in the collapsed state is housed in a protective sheath of which the surface is of a lesser strength and lends itself to rupturing when the balloon is being inflated.

Essentially the process of the invention is characterized by using an auxiliary carrier balloon of small size, by the space balloon being carried along in a wholly collapsed state through the lower layers and the tropopause —preferably being protected by a sheath—, by the balloon envelope during ascent only supporting its own weight as the load is suspended from the axial tie means of the carrier balloon, and lastly when at high altitudes by the upper and lower poles of the space balloon being locked relatively to each other on the axial tie means joining them.

The combination of these features provides the following results and advantages (which shall be better understood in relation to the description further below):

No excess tension at all is exerted on the space balloon whether on the ground or rising, whereby it can be manufactured specifically for high altitude flights to consist of a very thin and lightweight film, and whereby it can assume a very large volume without incurring any drawbacks.

The small carrier balloon does not take part in the subsequent mission and may be provided with high strength at a lesser cost, protecting it against any degradation on the ground and during the ascent, and this the more so that its slight volume makes it less vulnerable to the wind speed gradients and that the tie means joining its upper and lower poles absorbs part of the tensions and reduces those exerted on its envelope.

The small carrier balloon can be easily handled on the ground, and its take-off presents no difficulties.

On the ground, the space balloon is exposed to no handling that might damage its envelope; it is merely laid out in the ground in its protective sheath and its axial tie means is connected to that of the carrier balloon which will gradually lift it in the course of takeoff.

The carrier balloon used in particular may assume a generally elongated cylindrical shape with a height much larger than its diameter. Ground handling of such a balloon and its lunching are substantially simplified, while its manufacture may be highly economical by using elongated gores of a constant width over much of their height. The cutting and assembly of such gores along straight lines over most of their length represent easy and economical operations.

As regards the space balloon, it is made by any known method, and shall in the deployed state assume a shape proper to the design mission; it may be made of a very thin film of low unit area mass. The procedure described in the patent application Ser. No. 218,749 filed Dec. 22, 1980 by the same applicant may also be employed.

Moreover, in another feature of the invention, the transfer duct located between the carrier and space balloons is extended downward inside the space balloon by a deforming, flexible sleeve. Sealing after transferring an appropriate amount of gas may thus be implemented in a natural manner by deforming this flexible sleeve by hydrostatic pressures acting around it from the gas contained in the space balloon.

As a novel means the invention applies to a carrier balloon for implementing the above described process; this carrier balloon is characterized by comprising a tie means between its upper and lower poles and by being of a generally elongated shape, roughly cylindrical, over much of its height.

Other features, purposes and advantages of the invention will be made clear in the description below in relation to the attached drawings which are shown in illustrative and non-restrictive manner; these drawings are an integral part of this description.

FIG. 1 is a schematic view of the carrier balloon of the invention, in the inflated state;

FIG. 2 is a detailed cross-section of this carrier balloon at the level of its lower pole;

FIG. 3 is a view of an elongated gore from which the carrier balloon is made;

FIGS. 4 and 5 are detail views illustrating the assembly of these gores;

Figure 6:
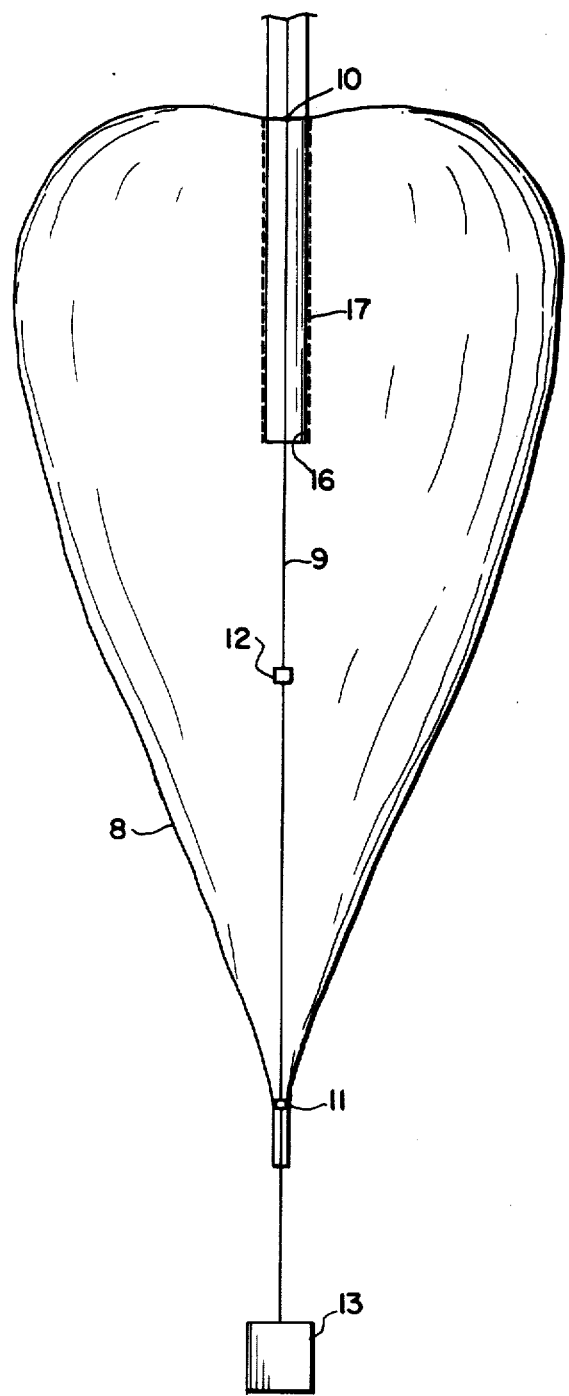
FIG. 6 is a schematic view of a space balloon which is launched by the method of the invention and which is assumed in this figure to be half-way between the collapsed and the inflated states.

FIGS. 10, 11, 12, 13, 14 and 15 schematically illustrate the sequential launching and inflation procedure of the invention.

The schematic auxiliary carrier balloon 1 shown in FIG. 1 is essentially cylindrical in shape and with a diameter small compared to its height; it comprises a non-stretching axis tie means 2, for instance a braided polyester cable, which joins its upper and lower poles 3 and 4 respectively.

This carrier balloon is implemented by means of gores such as 5 with a constant width over much of their height and which narrow at their ends. These gores may be made of a reinforced polyethylene film of a thickness of the order of 50 microns. These gores are assembled edge against edge by means of longitudinal reinforcing tapes such as 6 capable of withstanding part of the longitudinal stresses exerted on the envelope.

In the example shown in FIG. 5, the two gores are assembled by means of two reinforcing tapes located on either side of the film.

The gores are interrupted at their lower end by an opening 1a; the reinforcing tapes extend to the level of said opening as shown in FIG. 2 and are both fastened on the axial tie means so as to transmit to it part of the stresses.

A transfer duct 7 furthermore is fastened underneath the carrier balloon opposite its opening.

Similarly, reinforcing tapes are fastened at the level of the upper pole to the axial tie means for the purpose of transmitting stresses. A valve may be mounted in conventional manner at the level of this upper pole to control vertical steering of the carrier balloon.

As a simple illustration, the dimensions of such a carrier balloon assumed to be inflated are provided below:

height: roughly 115 m
diameter: roughly 9.2 m
volume: roughly 7,7000 m$^3$.

A balloon of so modest a volume can easily be manufactured at low cost particularly because of the shape of its straight edge gores. The combination of a high-strength film, longitudinal reinforcing tapes and the axial tie means results in a balloon capable of withstanding high stresses and of crossing undamaged the lower layers of the atmosphere and the tropopause while pulling a high load.

Figure 7:
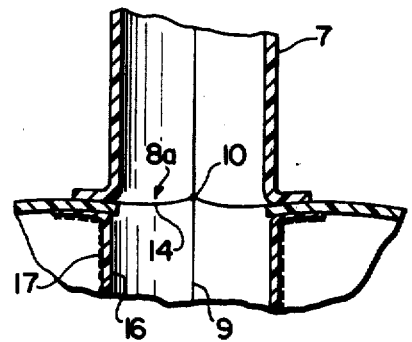
FIG. 7 is a detail section through this space balloon at the level of the upper pole.
Figure 8:
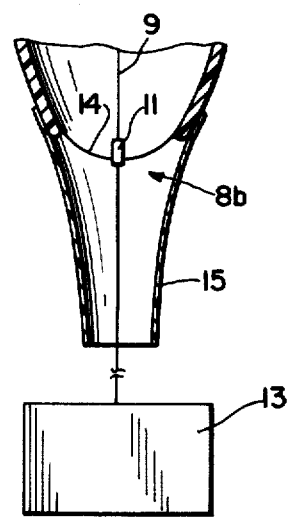
FIG. 8 is a detail section at the level of its lower pole.

The FIGS. 6, 7 and 8 are schematics of a space balloon to be launched from the carrier balloon described above.

This space balloon consists of a very thin polyester film envelope 8, less than 10 microns. This balloon includes an axial tie means 9 of the same type as the carrier balloon's. The upper pole 10 of the space balloon is bound to said axial tie means, while the lower pole 11 can slide along said tie means until reaching an end position where it is locked at the level of a member 12 fixed to said axial tie means.

This locking can be implemented by ratcheting a member fixed to the pole 11 with the conjugate member 12 fixed to the tie means. More details will be found in the patent application which is filed simultaneously with the present one.

The axial tie means 9 extends below the space balloon, and a load 13 is suspended from its end.

As for the space balloon, the envelope 8 may be made from a plurality of longitudinal gores assembled edge against edge by means of longitudinal reinforced tapes. These gores are interrupted at the level of the upper pole 10 of the balloon so as to form an opening 8a, and the reinforcing tapes (seen at 14 in FIG. 7) extends as far as the axial tie means 9 to which they are fastened.

An opening 8b is provided at the level of the lower pole 11 (FIG. 8) in a similar manner and with the reinforcing tapes 14 fastened to the slide member which is guided by the axial tie means. A conventional evacuation sleeve 15 is fixed underneath the balloon opposite the opening 8b to permit evacuating the gases to the balloon.

A deforming and flexible sleeve 16 made of polyethylene and about 20 microns thick is fastened at the level of the upper pole inside the space balloon around the opening 8a as an extension of the transfer duct 7. This flexible sleeve 16 extends across part of the length of the axial cable 9 so that the transferred gas will inflate the balloon approximately over its entire height.

This flexible sleeve 16 is designed to act as a closing valve when the hydrostatic pressure inside the space balloon reaches a predetermined value; this sleeve is surrounded by a sheath 17 which is permeable and resistant to the gas. This sheath prevents a centrifugal deformation of the flexible sleeve 16 taking place during the gas transfer while nevertheless allowing this sleeve to deform centripetally.

A merely illustrative dimensional example of such a space balloon assumed in the inflated state is provided below:

height: about 150 m
diameter: about 144 m
volume: about 2,350,000 $m^3$.

Figure 9:
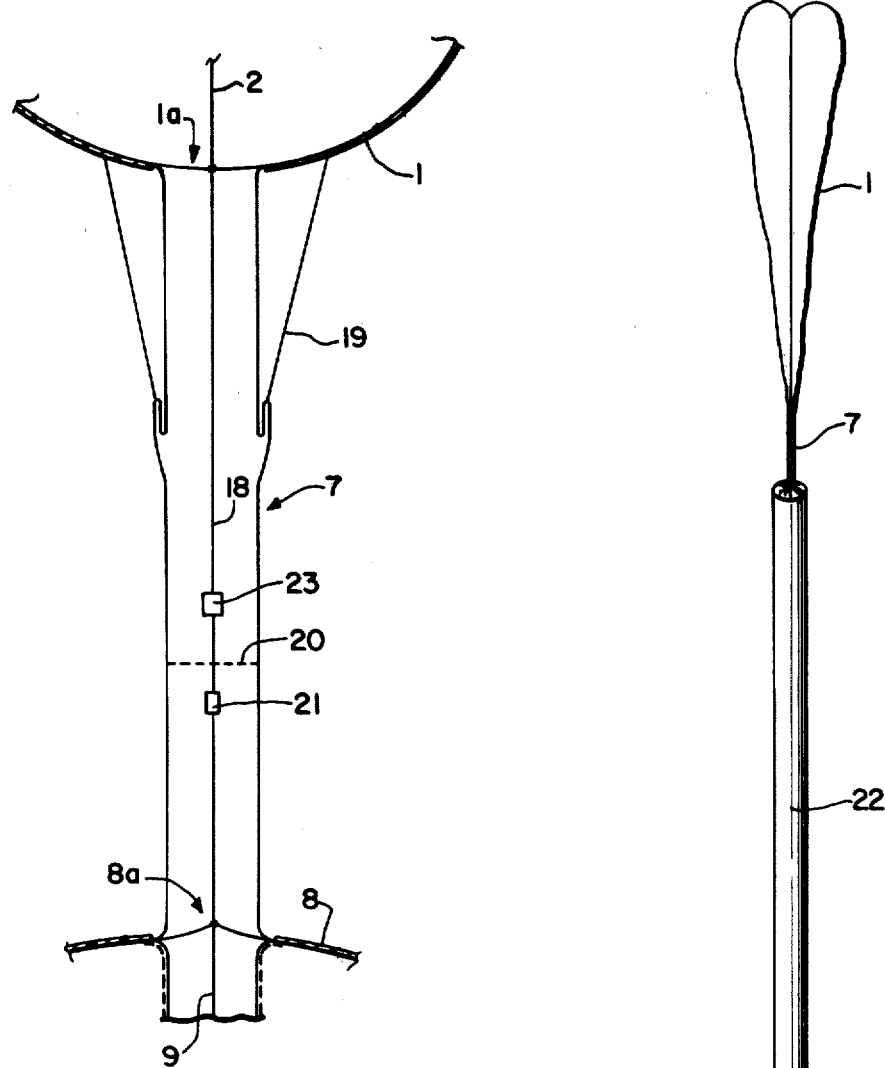
FIG. 9 is a schematic view of the transfer duct joining the carrier and space balloons.
Figure 10:
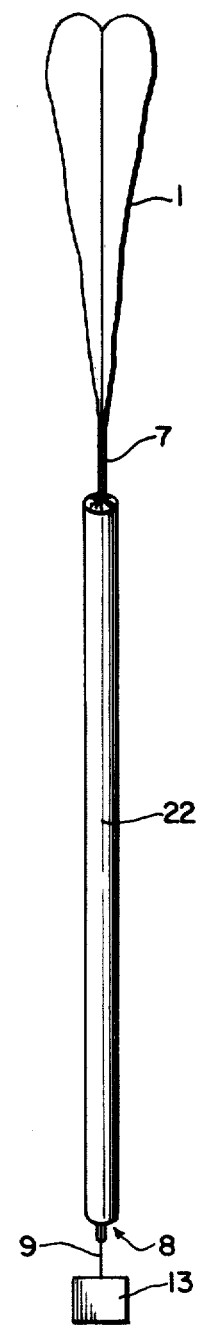

The FIG. 9 schematically shows the transfer duct 7 joining the carrier balloon 1 with the space balloon 8 and providing the communicating means between the openings 1a and 8a of these balloons; this duct is made of a reinforced polyethylene type material, about 50 microns thick, so as to offer high strength; it contains a tie means 18 extending and connecting the axial tie means 2 and 9 of the carrier and space balloons.

The transfer duct 7 is provided with a schematic antitorsion device 19 that may consist of several elastic stays hooked underneath the carrier balloon and to the duct so as to elastically pull latter upward.

Furthermore, the duct 7 is equipped with a conventional member to be served by control. This member may consist of an electric wire loop 20 which when heated by the control in turn will heat the duct and cause it to rupture. This type of component is well known and will not be discussed further.

Again, the tie means 18 itself is provided with a member 21 to rupture it by command. This component also is conventional per se and may consist of an explosive charge or a mechanical component of two pieces mutually hooking into one another and fitted to separate on command.

The tie means 18 moreover is provided with a component 23 for measuring the tension applied to said means. Said component is designed to control member 20 and member 21 when, in flight, the tension drops to a predetermined value, for the purpose of separating the space and carrier balloons 8 and 1 respectively.

These controls and measuring means are known per se.

As the various characteristics of the carrier and space balloons and their connection have been now described, the description below shall concern the sequence of the launching and inflation operations in relation to FIGS. 10 through 15. It must be understood that these figures are only explanatory schematics which are merely provided to facilitate understanding the process of the invention.

The space balloon 8 is housed when in its collapsed state in a sheath 22 which protects it over its entire height and eliminates dangers of degradation to its envelope during transportation and launch; this sheath is applied at once after the balloon has been manufactured so as to prevent it be subject to handling, considering the high fragility of the thin film from which it is formed.

The load 13 is suspended from the end of the axial cable 9, and the aggregate formed by the carrier balloon 1, transfer duct 7 and space balloon 8 in its sheath is spread on the ground at the launching surface.

Next the carrier balloon is partly inflated using helium or hydrogen, in conventional manner, by an (omitted) inflation duct. Gradually the carrier balloon takes off and progressively lifts the space balloon. Archimede's buoyancy can be measured at the level of the load 13, and when this buoyancy reaches a given value, corresponding to an amount of gas proper to the mission, in the carrier balloon, the load 13 is freed and the aggregate rises into the atmosphere. For instance if it assumed that the capacity of the carrier balloon is 7,700 $m^3$ when inflated and that the weight of the aggregate, (including the load), is 1,000 kgf, then this carrier balloon can be inflated on the ground to a volume of about 1,220 $m^3$ whereby at the time of release an upwardly directed resultant force of about 1,100 kgf will be obtained.

It is emphasized that the load 13 is directly suspended from the carrier balloon by cables 9 and 18, the envelope of the space balloon being subjected to no other load than its own weight. Also, the elongated shape of the overall aggregate and the small size of the carrier balloon make it easy to launch the aggregate.

During the first phase of ascent, the carrier balloon expands to its inflated state. In the above example, this condition is reached at an altitude of about 15 km, following the crossing of the lower atmospheric layers.

Figure 11:
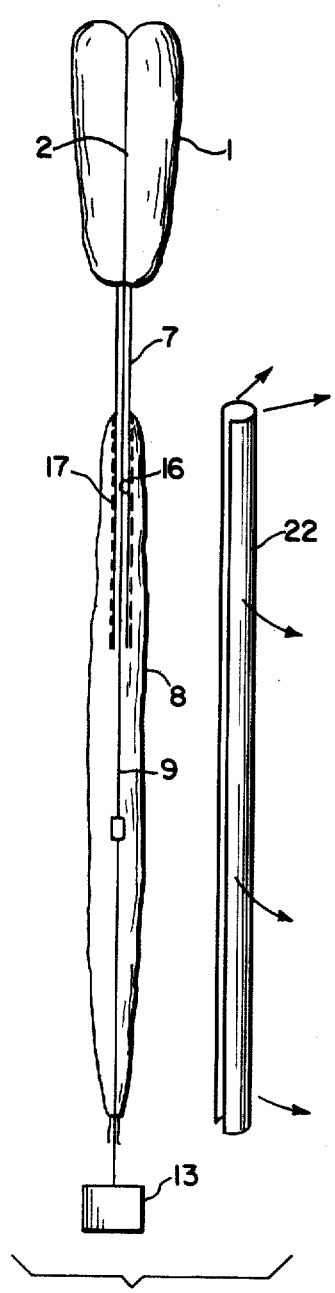

It is then that the gas transfer through the duct 7 into the space balloon 8 begins. The flexible inside sleeve 16 starts to inflate on all its length until it presses against its sheath 17, whereafter the space balloon inflates in turn as schematically indicated in FIG. 11 until the sheet 22 is ruptured and then detached from the aggregate.

Figure 12:
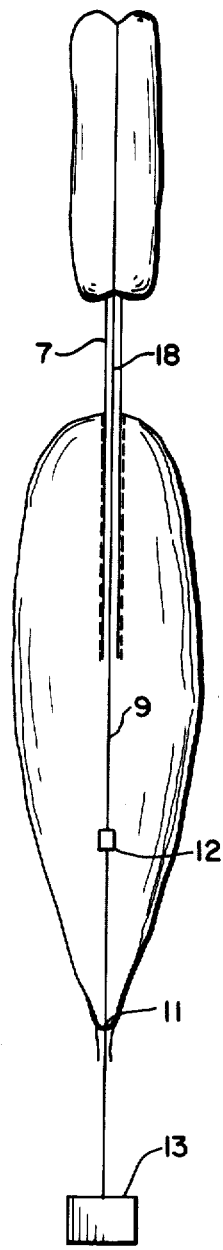

During the subsequent ascent phases, the space balloon receives gas through the transfer duct and continues to expand. Its lower pole 11 slides slowly upward along the axial cable 9, as illustrated in FIG. 12.

When this pole arrives at the level of the member 12 fixed to cable 9, it locks by ratcheting action on said cable and the balloon expansion goes on by means of a non-stretching connection between its lower and upper poles. In the above example, this ratcheting action may take place at about 40 km altitude.

As it rises, the space balloon progressively takes part in carrying the load and the tension on cable 18 connecting the two balloons decreases. When said tension drops to a predetermined value which is computed as a function of the desired separation altitude, the transfer duct 7 will be severed from the cable 18. This separation may be carried out in particular after crossing the tropopause, at an altitude of about 26.5 km.

Thereupon the carrier balloon is released from the load and escapes upward at a rate of ascent exceeding that of the space balloon.

The hydrodynamic pressure exerted on the flexible sleeve 16 then seals latter as schematically shown in FIG. 14, and the natural expansion of the balloon proceeds until it is fully inflated.

Illustratively and on a smaller scale, FIG. 15 shows the profile of a fully expanded balloon, as a cardiocylindrical figure, with a volume of about 2,350,000 $m^3$ at an altitude of 56 km and with a load of 100 kg. The method of launching and inflation cited above allows applying very gradually the tensions to the space balloon and considerably reduces the local excess stresses and the dangers of tearing or dislocations despite the very low unit-area mass of its material.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A method for launching and inflating a load-carrying space balloon of the type having upper and lower poles and using an auxiliary carrier balloon of a volume less than said space balloon, whereby said space balloon in a collapsed state is fastened beneath the carrier balloon and the carrier balloon is partially inflated by means of a lighter-than-air gas for inducing the takeoff of the two balloons and a gas transfer into the space balloon, said method comprising providing a space balloon having a substantially non-stretching axial tie means to which is fastened said upper pole of said space balloon and along which may slide said lower pole until said lower pole reaches a predetermined fixed position on said axial tie means, suspending a load from said axial tie means, providing an auxiliary carrier balloon having upper and lower poles and a substantially non-stretching axial tie means between the upper and lower poles of said carrier balloon and being made of high mechanical strength material for withstanding the stresses generated in the atmospheric layers to be crossed, fastening the collapsed space balloon beneath the carrier balloon, connecting the axial tie means of the two balloons and providing between said balloons a gas transfer duct joining the inside volumes of said balloons, launching said balloons and transfering a given amount of gas into said space balloon, and thereafter inducing the sealing of said transfer duct, separating the space balloon from the carrier balloon by severing the transfer duct and the tie means joining the two balloons, sliding the lower pole of said space balloon along the axial tie means thereof, securing said lower pole on said axial tie means at said predetermined position to achieve the fully inflated state of said space balloon.

2. A launching and inflating method as in claim 1 and including providing said carrier balloon with a generally elongated cylindrical shape and a height greatly exceeding the diameter thereof.

3. A method for launching and inflating as in claim 2 and including providing said carrier balloon constructed of a mechanically high-strength film and said space balloon constructed of a thin film of low unit-area mass.

4. A method for launching and inflating as in claim 3 and including providing said carrier balloon and said space balloon with longitudinal gores assembled edge-to-edge by means of longitudinal reinforcing tapes capable of withstanding the longitudinal stresses exerted on the balloons providing an opening in each of said balloons, fastening said transfer duct to each of said balloons around said openings therein, and said reinforcing tapes extending to the levels of said openings as far as the axial tie means to which they are fixed.

5. A method for launching and inflating as in claim 4 and including providing said gores with a constant width over a substantial part of their height.

6. A method for launching and inflating as in any one of claims 1, 2, 3, 4 or 5 and including providing a protective sheath of a material having less mechanical strength than the space balloon for housing said space balloon whereby inflation of said space balloon causes rupture of said protective sheath.

7. A method for launching and inflating as in claim 6 and including making said transfer duct as a deformable, flexible sleeve projecting into the interior of said space balloon, and sealing said transfer duct by means of hydrostatic pressure exerted thereon by the gas in said space balloon.

8. A method for launching and inflating as in claim 7 and including providing a gas-permeable sheath within said space balloon and surrounding said transfer duct for preventing centrifugal deformation of said flexible sleeve within said space balloon.

9. A method for launching and inflating as in claim 6 and including providing a first locking member on the lower pole of said space balloon and a second locking member on said tie means of said space balloon and cooperative with said first locking member, and interengaging said first and second locking members for securing said lower pole of said space balloon on said axial tie means of said space balloon.

10. A method for launching and inflating as in any one of claims 1, 2, 3, 4 or 5 and including providing said transfer duct with an anti-torsion member.

11. A method for launching and inflating as in any one of claims 1, 2, 3, 4 or 5 and including providing said axial tie means with means for measuring the tension in said axial tie means measuring the tension in said axial tie means and producing a command for separating said space balloon and said carrier balloon when the tension in said axial tie means drops to a predetermined value.

12. A carrier balloon for launching and inflating a load-carrying space balloon, said carrier balloon having a generally elongated cylindrical shape and having upper and lower poles, tie means connecting said poles and passing through said carrier balloon, a plurality of longitudinally extending gores, said gores being of substantially constant width over a major portion of the length thereof, longitudinally extending reinforcing tapes connecting the edges of adjacent gores so as to form said carrier balloon, said reinforcing tapes extending below the lowermost edge of said gores and being attached to said tie means so as to form an opening at the lower pole of said carrier balloon, and the upper pole of said carrier balloon being closed.

* * * * *